US009860007B2

(12) United States Patent  
Yasukawa et al.

(10) Patent No.: US 9,860,007 B2  
(45) Date of Patent: Jan. 2, 2018

(54) USER TERMINAL, RADIO BASE STATION, AND RADIO COMMUNICATION METHOD

(71) Applicant: NTT DOCOMO, INC., Tokyo (JP)

(72) Inventors: Shimpei Yasukawa, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 17 days.

(21) Appl. No.: 15/113,456

(22) PCT Filed: Jan. 14, 2015

(86) PCT No.: PCT/JP2015/050807  
§ 371 (c)(1),  
(2) Date: Jul. 22, 2016

(87) PCT Pub. No.: WO2015/111484  
PCT Pub. Date: Jul. 30, 2015

(65) Prior Publication Data  
US 2017/0012727 A1    Jan. 12, 2017

(30) Foreign Application Priority Data  
Jan. 22, 2014  (JP) .................. 2014-009853

(51) Int. Cl.  
*H04J 11/00* (2006.01)  
*H04W 72/12* (2009.01)  
(Continued)

(52) U.S. Cl.  
CPC .......... *H04J 11/0023* (2013.01); *H04L 5/005* (2013.01); *H04L 5/14* (2013.01);  
(Continued)

(58) Field of Classification Search  
CPC ...... H04J 11/0023; H04L 5/14; H04L 45/745; H04L 5/005; H04W 72/14; H04W 72/1289; H04W 72/1284  
See application file for complete search history.

(56) References Cited

U.S. PATENT DOCUMENTS

| 2013/0201884 | A1* | 8/2013 | Freda ................. H04W 72/005 370/278 |
| 2015/0023145 | A1* | 1/2015 | Kim ..................... H04L 5/1469 370/201 |

(Continued)

OTHER PUBLICATIONS

International Search Report issued in corresponding application No. PCT/JP2015/050807 dated Apr. 14, 2015 (4 pages).  
(Continued)

*Primary Examiner* — Jay P Patel  
(74) *Attorney, Agent, or Firm* — Osha Liang LLP (57) ABSTRACT

For the purpose of preventing transmission of UL signals in a subframe other than a UL subframe during the fallback operation in Dynamic TDD communication, the present invention provides a user terminal for communicating in Dynamic TDD, the user terminal having: a reception section that receives control information including an indication to dynamically change a subframe configuration of a Dynamic TDD cell and a control section that controls not to perform specific resource transmission in flexible subframes in the fallback operation based on the subframe configuration of Dynamic TDD cell signaled by higher layers or SIB1.

6 Claims, 8 Drawing Sheets

(51) Int. Cl.
*H04L 5/00* (2006.01)
*H04L 5/14* (2006.01)
*H04L 12/741* (2013.01)
*H04W 72/14* (2009.01)

(52) U.S. Cl.
CPC ....... *H04L 45/745* (2013.01); *H04W 72/1289* (2013.01); *H04W 72/14* (2013.01); *H04W 72/1284* (2013.01)

(56) References Cited

U.S. PATENT DOCUMENTS

| | | | | |
|---|---|---|---|---|
| 2015/0055521 A1* | 2/2015 | Seo | ................. | H04L 5/001 370/280 |
| 2015/0245344 A1* | 8/2015 | You | ................. | H04J 11/00 370/280 |
| 2017/0164400 A1* | 6/2017 | Fong | ................. | H04W 72/1284 |
| 2017/0238272 A1* | 8/2017 | You | ................. | H04W 56/0015 370/350 |

OTHER PUBLICATIONS

Written Opinion of the International Searching Authority issued in corresponding application No. PCT/JP2015/050807 dated Apr. 14, 2015 (3 pages).

3GPP TS 36.300 V12.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).

Extended European Search Report issued in corresponding European Patent Application No. 15740799.0, dated Oct. 9, 2017 (9 pages).

InterDigital, "On signaling and fallback operation for TDD UL-DL reconfiguration", 3GPP TSG-RAN WG1 Meeting #74, R1-133175, Barcelona, Spain, Aug. 19-23, 2013 (4 pages).

* cited by examiner

| UL-DL CONFIGURATION | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

FIXED SUBFRAME
FLEXIBLE SUBFRAME

USER TERMINAL, RADIO BASE STATION, AND RADIO COMMUNICATION METHOD

TECHNICAL FIELD

The present invention relates to a user terminal, a radio base station and a radio communication method in next-generation mobile communication systems.

BACKGROUND ART

In a UMTS (Universal Mobile Telecommunications System) network, for the purposes of achieving higher-speed data rates, providing low delay and so on, long-term evolution (LTE) has been under study (see Non Patent Literature 1).

In LTE, as multi access schemes, an OFDMA (Orthogonal Frequency Division Multiple Access)-based system is adopted for the downlink and an SC-FDMA (Single Carrier Frequency Division Multiple Access)-based system is adopted for the uplink.

For the purposes of achieving further broadbandization and higher speed, successor systems to LTE are also under study, which are called , for example, LTE advanced or LTE enhancement, and specified in LTE Rel. 10/11 (LTE-A).

As duplex modes in radio communications of the LTE system and LTE-A system, there are FDD (Frequency Division Duplex) for dividing uplink (UL) and downlink (DL) by frequency and TDD (Time Division Duplex) for dividing uplink and downlink by time.

Figure 1:
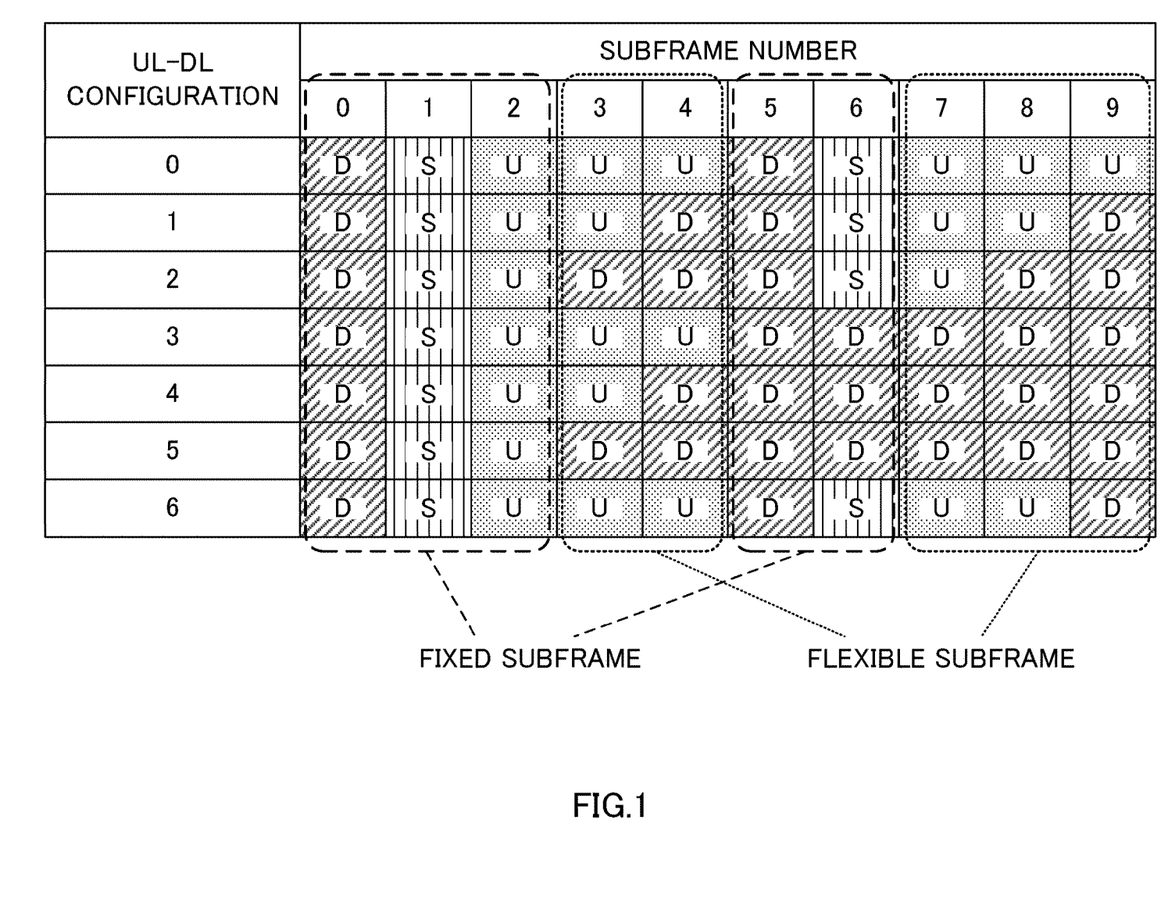
FIG. 1 is a diagram for explaining existing UL-DL configurations.

In TDD of the LTE system, there are defined UL-DL configurations #0 to #6 of which ratios between UL subframes and DL subframes in a radio frame are mutually different from each other (see FIG. 1). The user terminal performs communication based on any of the UL-DL configurations that is given by SIB1 (System Information Block Type1).

In LTE Rel. 12, which is a further successor system to LTE, study has been made of Dynamic TDD (or Rel. 12 eIMTA (enhanced Interference Management and Traffic Adaptation)) in which TDD frame configurations are dynamically switched in accordance with uplink and downlink traffics by dynamically switching existing UL-DL configurations.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall description; Stage 2"

SUMMARY OF THE INVENTION

Technical Problem

In Dynamic TDD, the user terminal sometimes is not able to recognize an actual UL-DL configuration that is dynamically changed from the UL-DL configuration given by SIB1. In such a case, if the user terminal performs the fallback operation and monitors PDCCH or EPDCCH in accordance with the UL-DL configuration given by SIB1, the user terminal is likely to transmit UL signals wrongly in subframes other than UL subframes in the actual UL-DL configuration.

The present invention was carried out in view of the foregoing and aims to provide a user terminal, a radio base station and a radio communication method that are capable of preventing transmission of UL signals in subframes other than UL subframes during the fallback operation In Dynamic TDD-based communication.

Solution to Problem

The present invention provides a user terminal comprising: a reception section that receives control information including a subframe configuration of a TDD (Time Division Duplex) cell signaled by L1 signaling; and a control section that, when the user terminal does not detect the subframe configuration signaled by L1 signaling, controls to stop transmission of sounding reference signals in a subframe to which transmission of an uplink shared channel is not allocated by uplink grant.

Technical Advantage of the Invention

According to the present invention, it is possible to prevent transmission of UL signals in subframes other than UL subframes in the fallback operation in Dynamic TDD-based communication.

DESCRIPTION OF EMBODIMENTS

With reference to the attached drawings, embodiments of the present invention will be described in detail below.

FIG. 1 is a diagram for explaining seven UL-DL configurations in TDD. "D" denotes a DL subframe, "U" denotes a UL subframe and "S" denotes a special subframe.

In Dynamic TDD, it is possible to dynamically switch to a UL-DL configuration that is different from a UL-DL configuration given by SIB1. However, in order to support backward compatibility, DL subframes and special subframes given by SIB1 cannot be changed to UL subframes.

For example, in the UL-DL configuration #0 illustrated in FIG. 1, DL subframes (subframe numbers 0, 5) and special subframes (subframe numbers 1, 6) remain as DL subframes and special subframes in other UL-DL configurations #1 to #6. Accordingly, when the UL-DL configuration #0 is given by SIB1, the UL-DL configuration can be dynamically switched to any of the other UL-DL configurations #1 to #6.

On the other hand, in the UL-DL configuration #1, the subframe number 4 denotes a DL subframe, however, in the UL-DL configurations #0, #3 and #6, the subframe number 4 denotes a UL subframe. Accordingly, when the UL-DL configuration #1 is given by SIB1, the UL-DL configuration cannot be dynamically changed to any of the UL-DL configurations #0, #3 and #6.

As illustrated in FIG. 1, radio frames include fixed subframes and flexible subframes. The fixed subframes are subframes of which transmission direction is fixed over different UL-DL configurations. The flexible subframes are subframes of which the transmission direction is not fixed over different UL-DL configurations. The flexible subframes are switched between UL subframe and DL subframe in Dynamic TDD.

The user terminal may be notified of fixed subframes and flexible subframes implicitly by UL-DL configuration given by SIB1 or by using a broadcast signal or higher layer signaling including RRC (Radio Resource Control) signaling.

In Dynamic TDD, an actual UL-DL configuration dynamically changed from the UL-DL configuration given by SIB1 is given to the user terminal by L1 signaling using a physical downlink control channel (physical downlink control channel) or an enhanced physical downlink control channel (EPDCCH: Enhanced PDCCH).

When the user terminal has failed to receive this L1 signaling or before the user terminal returns back from a discontinuous reception (DRX) state to receive L1 signaling, the user terminal is not able to know the actual UL-DL configuration given by the L1 signaling.

In such a case, the user terminal has been proposed to perform fallback operation to monitor PDCCH or EPDCCH in accordance with the UL-DL configuration given by SIB1 or UL-DL configuration given by higher layer signaling.

In this fallback operation, the user terminal is able to perform transmission based on the actual UL-DL configuration as for signals of which transmission subframes are dynamically given by PDCCH or EPDCCH, for example, uplink shared channel (PUSCH: Physical Uplink Shared Channel). However, in other cases, the user terminal may transmit signals UL signals in DL subframes or special subframes in the actual UL-DL configuration wrongly. If the user terminal transmits UL signals in subframes other than the UL subframes in the fallback operation, there is expected to occur intra-cell interference.

Then, the present inventors have found a specific resource transmission rule for the user terminal to prevent specific resource transmission in subframes other than UL subframes in the actual UL-DL configuration.

In the fallback operation, as the specific resource transmission rule for the user terminal to prevent specific resource transmission in subframes other than the UL subframes in the actual UL-DL configuration, there is applied a first specific resource transmission rule to stop specific resources that are periodically transmitted in the fallback operation or a second specific resource transmission rule to define a specific resource configuration that is configurable only with fixed subframes only for Dynamic TDD.

Here, the specific resources mean signals other than those for dynamically signaling transmission subframes by PDCCH or EPDCCH. For example, specific resources denotes signals including periodic CSI (Chanel State Information), Scheduling Request (SR) or SRS (Sounding Reference Signal). Besides, as there may occur transmission in a subframe other than the UL subframe, the specific resources include those transmitted under application of TTI (Transmission Time Interval) bundling.

Explanation is made about the first specific resource transmission rule to stop specific resources that are transmitted periodically in the fallback operation.

When the first specific resource transmission rule is applied and Dynamic TDD is configured, the user terminal does not perform specific resource transmission in flexible subframes at all. In this case, the specific resource transmission in a flexible subframe is inhibited by implementation or as the user terminal operation.

Figure 2A:
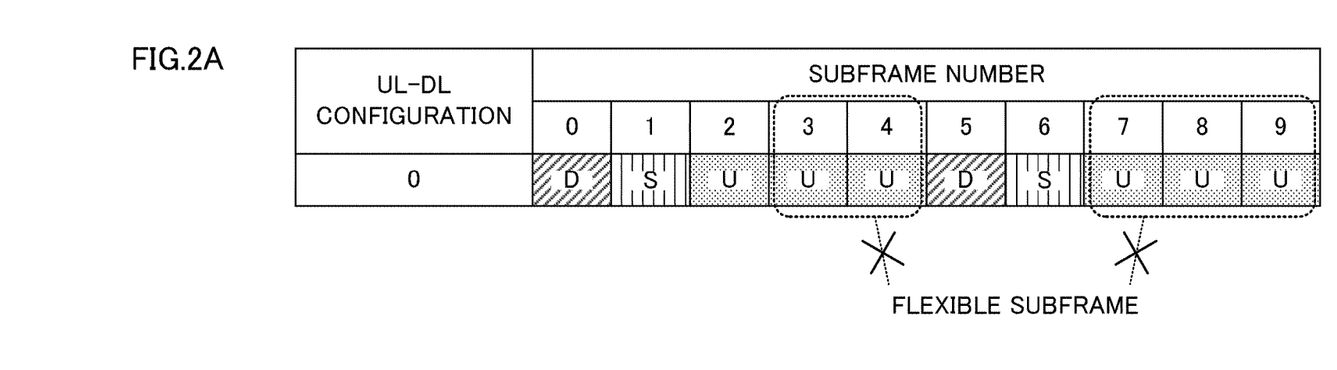
FIG. 2 provides diagrams each for explaining a configuration to which a first specific resource transmission rule is applied.

For example, as illustrated in FIG. 2A, when being notified of the UL-DL configuration #0 by SIB1, the user terminal does not perform specific resource transmission in flexible subframes of subframe numbers 3, 4, 7, 8 and 9.

With this process, even when the UL subframe in a flexible subframe is dynamically changed to a DL subframe or special subframe, it is possible to prevent the user terminal from transmitting UL signals in subframes other than the UL subframes in the fallback operation.

Otherwise, when the first specific resource transmission rule is applied and Dynamic TDD is configured, the user terminal does not perform specific resource transmission only in the UL subframes that are changed into DL subframes. That is, the user terminal performs specific resource transmission in a subframe that is not switched between UL subframe and DL subframe in the given UL-DL configuration, even if it is a flexible subframe.

Figure 2B:
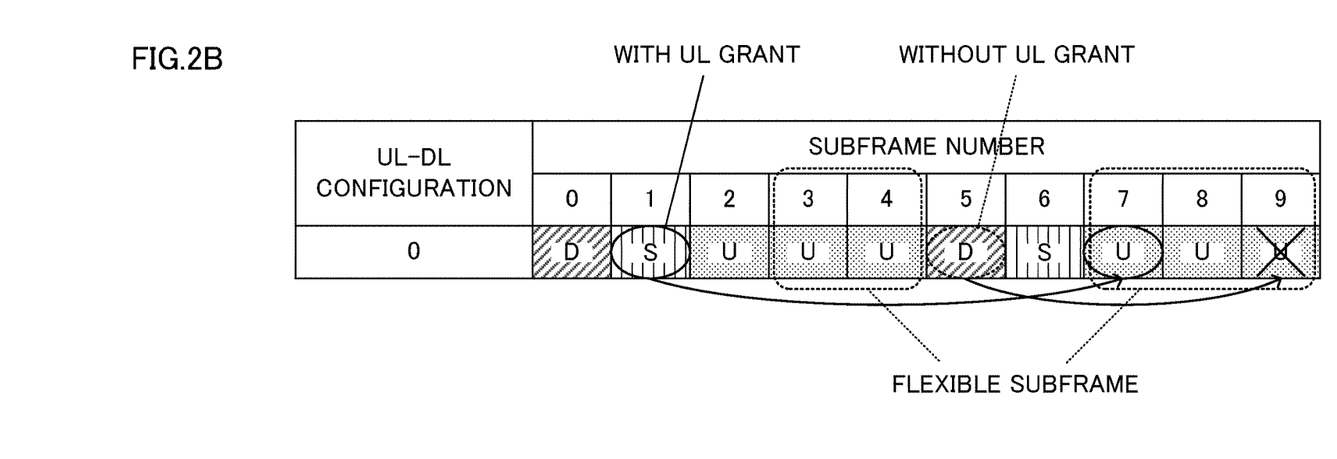

For example, as illustrated in FIG. 2B, when the UL-DL configuration #0 is given by SIB1, if the user terminal determines the subframe 7 as an UL subframe by UL grant given in a subframe that is several-subframe earlier than the subframe 7, the user terminal transmits an UL signal in the subframe 7 even when the subframe 7 is a flexible subframe. On the other hand, if the user terminal does not receive UL grant and is not able to determine the subframe 9 is a DL subframe or a UL subframe, the user terminal does not transmit a UL signal in the subframe 9.

With this structure, even when a UL subframe in flexible subframes is dynamically changed to a DL subframe or special subframe, the user terminal is able to be prevented from transmitting a UL signal in a subframe other than the UL subframes.

In the example illustrated in FIG. 2B, the user terminal determines whether the subframe is a UL subframe or a DL subframe by UL grant. However, irrespective of UL grant, this rule can be applied to every case where signaling and a signal as signaling target are not transmitted in the same subframe, like CSI-RS, and the user terminal can determine in advance that it is a UL subframe or a DL subframe.

Next description is made about the second specific resource transmission rule for defining specific resource configuration configurable only with fixed subframes for Dynamic TDD.

When the second specific resource transmission rule is applied, for application of Dynamic TDD, the radio base station and the user terminal use a table which is newly defined only with unchanged UL and DL subframes, that is, fixed subframes, as well as a transmission cycle of specific resources and transmission subframe offset.

Figure 3A:
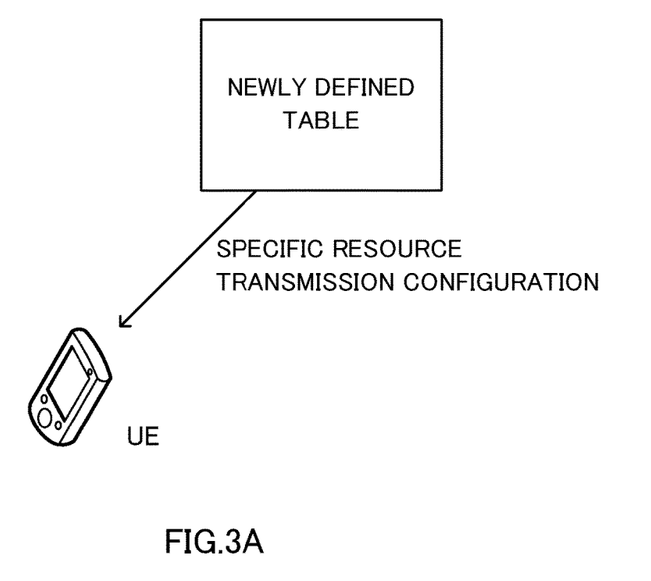
FIG. 3 provides diagrams each for explaining a configuration to which a second specific resource transmission rule is applied.

As illustrated in FIG. 3A, a radio base station signals one specific resource transmission configuration from the newly defined table, to the user terminal. This signaling is performed by a broadcast signal or higher layer signaling including RRC signaling. The user terminal to which Dynamic TDD is applied always transmits the specific resources in accordance with this configuration.

With this process, even when a UL subframe in flexible subframes is dynamically changed to a DL subframe or special subframe, it is possible to prevent the user terminal from transmitting a UL signal in a subframe other than the UL subframes.

Figure 3B:
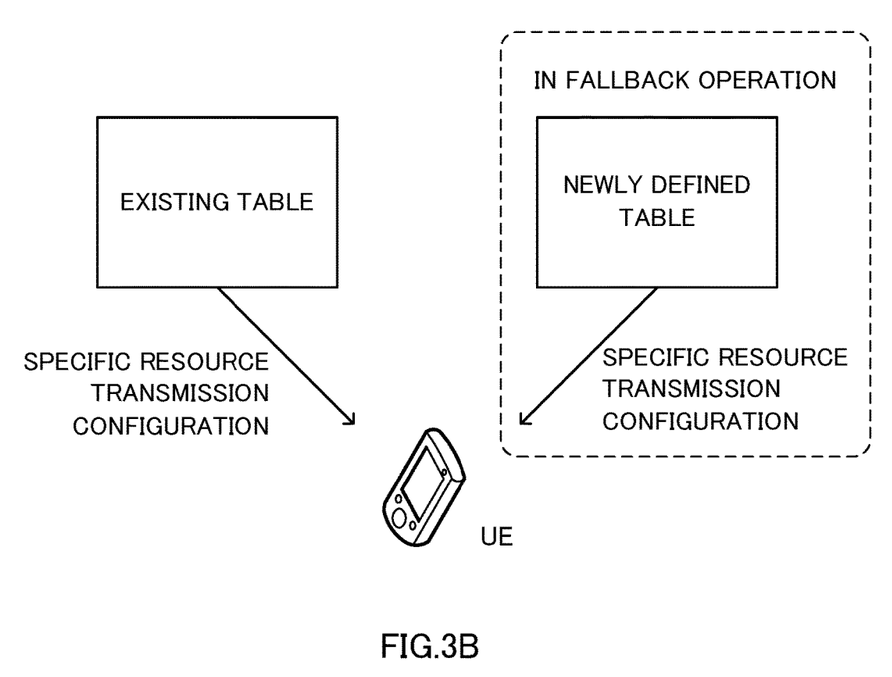

Or, as illustrated in FIG. 3B, the radio base station signals a specific resource transmission configuration from each of an existing table and the newly defined table to the user terminal. The user terminal to which Dynamic TDD is applied transmits specific resources using a specific resource transmission configuration based on the newly defined table in the fallback operation. Other than in the fallback operation, the user terminal transmits specific resources using a specific resource transmission configuration based on the existing table. In other words, the user terminal uses the specific resource transmission configuration by switching between in the fallback operation and in the other operations.

In the example illustrated in FIG. 3B, the newly defined table may be the same table as the existing table. The newly defined table also may be a table comprising the existing table. That is, the radio base station may signal, to the user terminal, two different specific resource transmission configurations from the existing table or signal, to the user terminal, two different specific resource transmission configurations from the newly defined table.

With this structure, even when a UL subframe in flexible subframes is dynamically changed to a DL subframe or special subframe, it is possible to prevent the user terminal from transmitting a UL signal in a subframe other than the UL subframes.

As to TTI bundling, it may be defined as not applied, instead of the above-mentioned first and second specific resource transmission rules so as to prevent specific resource transmission in a subframe other than actual UL subframes.

For example, the user terminal to which Dynamic TDD is applied may be defined as not being applied with TTI bundling by higher layer signaling such as RRC signaling.

For example, when Dynamic TDD is applied, absence of TTI bundling configuration may be defined by higher layer signaling such as RRC signaling.

For example, the user terminal to which Dynamic TDD is applied may be defined as to user terminal operations so as to ignore notification of application of TTI bundling from higher layer signaling such as RRC signaling.

As described up to this point, by applying the specific resource transmission rule to prevent the user terminal from performing specific resource transmission in a subframe other than the UL subframes in the actual UL-DL configuration in the fallback operation, it is possible to prevent the user terminal from transmitting the UL signal in a subframe other than the UL subframes in the fallback operation and thereby to prevent occurrence of intra-cell interference.

(Configuration of Radio Communication System)

The following description is made about the configuration of a radio communication system according to the present embodiment. In this radio communication system, a radio communication method is adopted to which the above-described specific resource transmission rules are applied.

Figure 4:
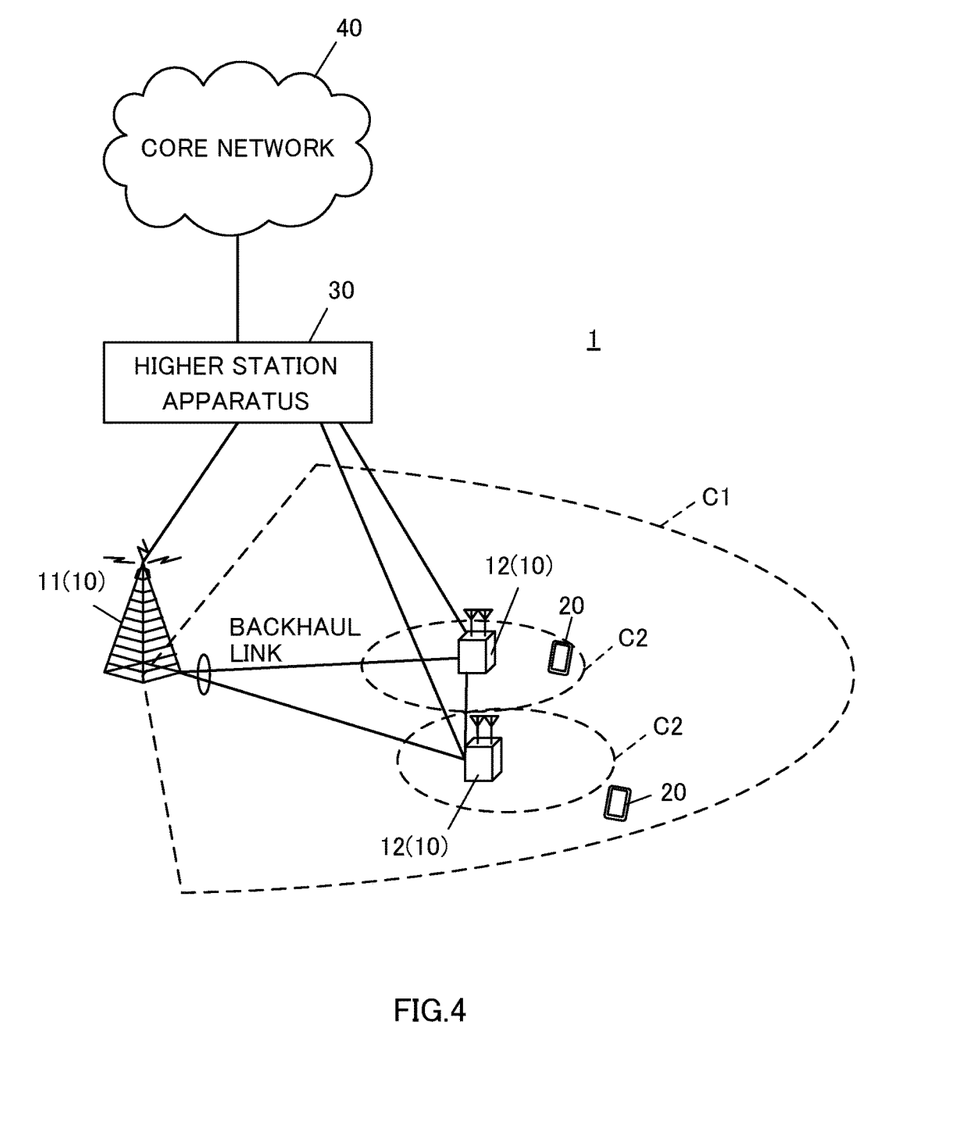
FIG. 4 is a diagram schematically illustrating an example of the configuration of a radio communication system according to the present embodiment.

FIG. 4 is a diagram schematically illustrating the configuration of a radio communication system according to the present embodiment. As illustrated in FIG. 4, the radio communication system 1 includes a plurality of radio base stations 10 (11 and 12) and a plurality of user terminals 20 that are located within cells of the respective radio base stations 10 and are configured to be able to communicates with the radio base stations 10. Each of the radio base stations 10 is connected to the higher station apparatus 30 and is connected to the core network 40 via the higher station apparatus 30.

In FIG. 4, the radio base station 11 is formed as a macro base station having a relatively wide coverage and forms a macro cell C1. The radio base station 12 is formed as a small base station having a local coverage and forms a small cell C2. The numbers of the radio base stations 11 and 12 are not limited to those illustrated in FIG. 4.

In the macro cell C1 and the small cell C2, the same frequency band may be used or different frequency bands may be used. The radio base stations 11 and 12 are connected to each other via inter-eNB interface (for example, optical fiber, X2 interface).

Between the radio base station 11 and the radio base station 12, between the radio base station 11 and another radio base station 11, or between the radio base station 12 and another radio base station 12, dual connectivity (DC) or carrier aggregation (CA) may be applied.

The user terminal 20 is a terminal supporting various communication schemes such as LTE and LTE-A and may include not only a mobile communication terminal, but also a fixed or stationary communication terminal. The user terminal 20 is able to carry out communication with another user terminal 20 via the radio base station 10.

The higher station apparatus 30 includes, but is not limited to, an access gateway apparatus, a radio network controller (RNC), a mobility management entity (MME) and so on.

In the radio communication system 1, used as downlink channels are a downlink shared channel (PDSCH: Physical Downlink Shared Channel) that is used by each user terminal 20 on a shared basis, a downlink control channel (PDCCH: Physical Downlink Control Channel, EPDCCH: Enhanced Physical Downlink Control Channel), and a broadcast channel (PBCH). The PDSCH is used to transmit user data, higher layer control information and predetermined SIB (System Information Block). PDCCH and EPDCC are used to transmit downlink control information (DCI).

In the radio communication system 1, used as uplink channels are an uplink shared channel (PUSCH: Physical Uplink Shared Channel) that is used by each user terminal 20 on a shared basis, an uplink control channel (PUCCH: Physical Uplink Control Channel) and the like. The PUSCH is used to transmit user data and higher layer control information.

Figure 5:
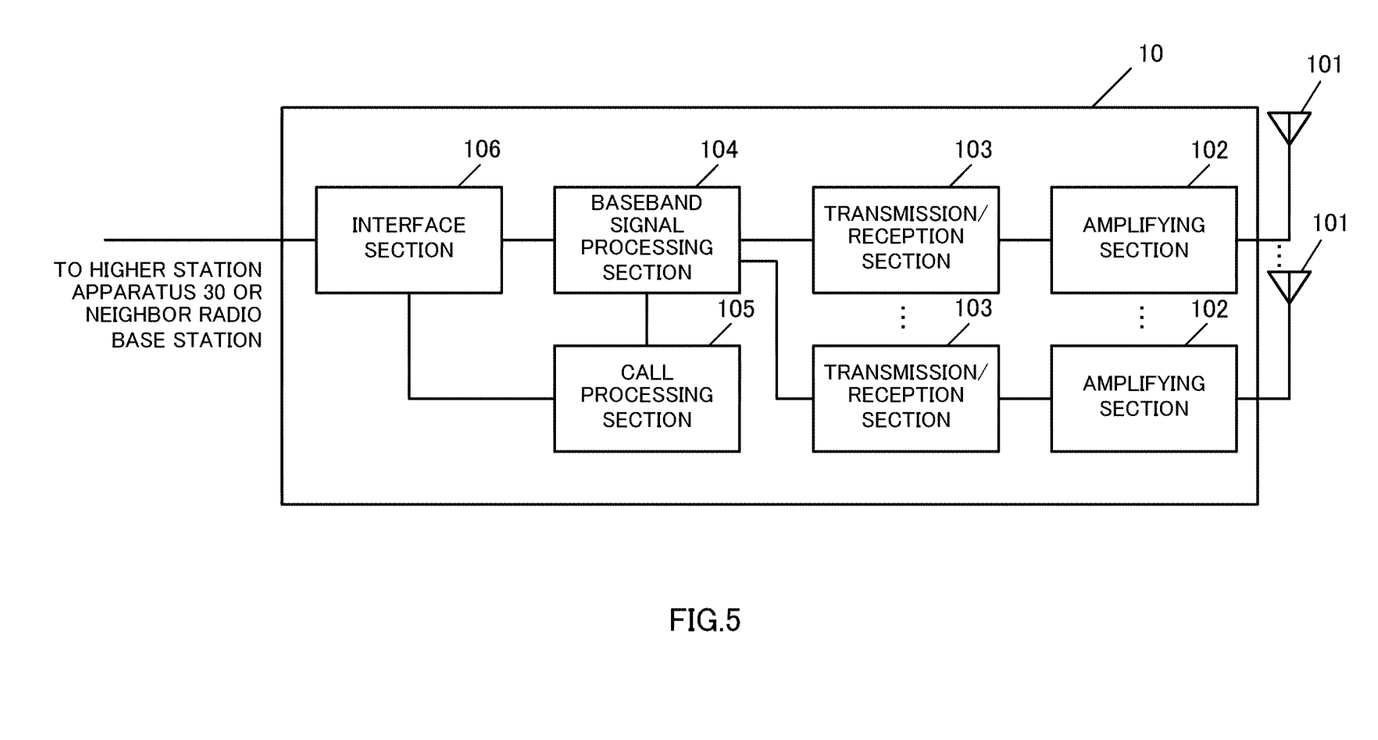
FIG. 5 is a diagram illustrating an example of entire configuration of a radio base station according to the present embodiment.

FIG. 5 is a diagram illustrating the entire configuration of the radio base station 10 according to the present embodiment. As illustrated in FIG. 5, the radio base station 10 has a plurality of transmission/reception antennas 101 for MIMO transmission, amplifying sections 102, transmission/reception sections 103, a baseband signal processing section 104, a call processing section 105 and an interface section 106.

User data transmitted from the radio base station 10 to a user terminal 20 on downlink is input from the higher station apparatus 30 to the baseband signal processing section 104 via the interface section 106.

In the baseband signal processing section 104, signals are subjected to PDCP layer processing, RLC (Radio Link Control) layer transmission processing such as division and coupling of user data and RLC retransmission control transmission processing, MAC (Medium Access Control)

retransmission control, including, for example, HARQ transmission processing, scheduling, transport format selection, channel coding, inverse fast Fourier transform (IFFT) processing, and precoding processing, and are transferred to each transmission/reception section 103. As for downlink control signals, transmission processing is performed, including channel coding and inverse fast Fourier transform, and resultant signals are transferred to each transmission/reception section 103.

The baseband signal processing section 104 notifies the user terminal 20 of control information for communications in this cell by MAC layer signaling, physical layer signaling, or higher layer signaling including RRC signaling. This control information includes, for example, information about a configuration of DL subframes and UL subframes used in Dynamic TDD cell.

Each transmission/reception section 103 receives downlink signals that are precoded per antenna and output from the baseband signal processing section 104 and converts the signals into a radio frequency band. Each amplifying section 102 amplifies frequency-converted radio frequency signals, which are then transmitted from each transmission/reception antenna 101.

Meanwhile, as for uplink signals, radio frequency signals received by each transmission/reception antenna 101 are amplified by each amplifying section 102, subjected to frequency conversion in each transmission/reception section 103 and converted into baseband signals and the converted signals are then input to the baseband signal processing section 104.

Each transmission/reception section 103 servers as a transmission section configured to transmit control information including information about the configuration of DL subframes and UL subframes used in Dynamic TDD cell, by MAC layer signaling. Each transmission/reception section 103 also serves as a transmission section configured to transmit a specific resource transmission configuration based on a newly defined table when the second specific resource transmission rule is applied.

The baseband signal processing section 104 performs FFT (Fast Fourier Transform) processing, IDFT (Inverse Discrete Fourier Transform) processing, error correction decoding, MAC retransmission control reception processing, and RLC layer and PDCP layer reception processing on user data included in the input uplink signals. The signals are then transferred to the higher station apparatus 30 via the interface section 106. The call processing section 105 performs call processing such as setting up and releasing a communication channel, manages the state of the radio base station 10 and manages the radio resources.

The interface section 106 performs transmission and reception of signals with a neighbor radio base station via inter-eNB interface (for example, optical fiber, X2 interface) (backhaul signaling). Or, the interface section 106 performs transmission and reception of signals with the higher station apparatus 30 via predetermined interface.

Figure 6:
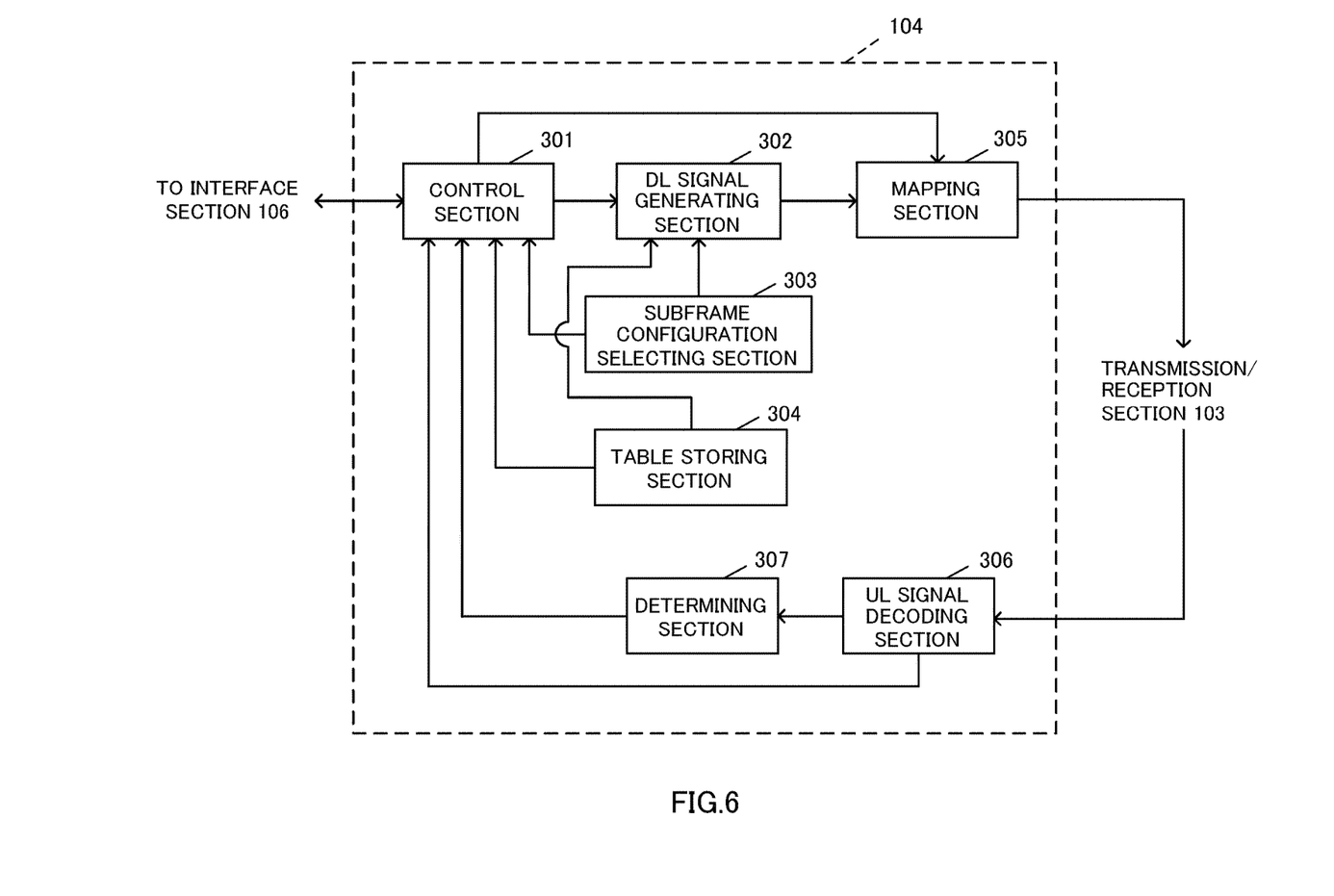
FIG. 6 is a diagram illustrating an example of functional structure of the radio base station according to the present embodiment.

FIG. 6 is a diagram illustrating main functional structures of the baseband signal processing section 104 provided in the radio base station 10 according to the present embodiment. As illustrated in FIG. 6, the baseband signal processing section 104 provided in the radio base station 10 is configured to include at least a control section 301, a DL signal generating section 302, a subframe configuration selecting section 303, a table storing section 304, a mapping section 305, a UL signal decoding section 306, and a determining section 307.

The control section 301 controls scheduling of downlink user data to be transmitted on PDSCH downlink reference signals, downlink control information to be transmitted on either or both of PDCCH and enhanced PDCCH (EPDCCH), and the like. The control section 301 also performs control of scheduling (allocation control) of RA preamble to be transmitted on PRACH, uplink data to be transmitted on PUSCH, uplink reference signals and uplink control information to be transmitted on PUCCH or PUSCH. Information about allocation of uplink signals (uplink control signals and user data) is given to the user terminal 20 using downlink control signals (DCI).

The control section 301 controls allocation of radio resources to downlink signals and uplink signals based on feedback information from each user terminal 20 and instruction information from the higher station apparatus 30. In other words, the control section 301 serves as a scheduler.

When the user terminal 20 is connected to a Dynamic TDD cell, the control section 301 controls allocation of DL signals and UL signals to each subframe based on a configuration of DL subframes and UL subframes selected by the subframe configuration selecting section 303. Also, when the user terminal is connected to the Dynamic TDD cell and follows the second specific resource transmission rule, the control section 301 controls to notify the user terminal 20 of a specific resource transmission configuration based on a newly defined table stored in the table storing section 304.

The DL signal generating section 302 generates downlink data signals and downlink control signals that are determined to be allocated by the control section 301. To be more specific, the DL signal generating section 302 generates DL assignment to notify the user terminal of allocation of DL signals and UL grant to notify the user terminal of allocation of UL signals based on instructions from the control section 301. The DL signal generating section 302 generates information about a subframe configuration selected by the subframe configuration selecting section 303. The DL signal generating section 302 generates information about a specific resource transmission configuration based on the table stored in the table storing section 304.

The subframe configuration selecting section 303 selects a subframe configuration to use in Dynamic TDD in consideration of traffic.

The table storing section 304 stores existing tables and newly defined tables.

The mapping section 305 controls allocation of downlink data signals and downlink control signals generated by the DL signal generating section 302 to radio resources based on instructions from the control section 301.

The UL signal decoding section 306 decodes feedback signals such as transmission acknowledgement signals transmitted from the user terminal on an uplink control channel and outputs them to the control section 301. The UL signal decoding section 306 decodes uplink data signals transmitted from the user terminal on an uplink shared channel and outputs them to the determining section 307.

The determining section 307 determines retransmission based on a decoding result of the UL signal decoding section 306 and outputs a determination result to the control section 301.

Figure 7:
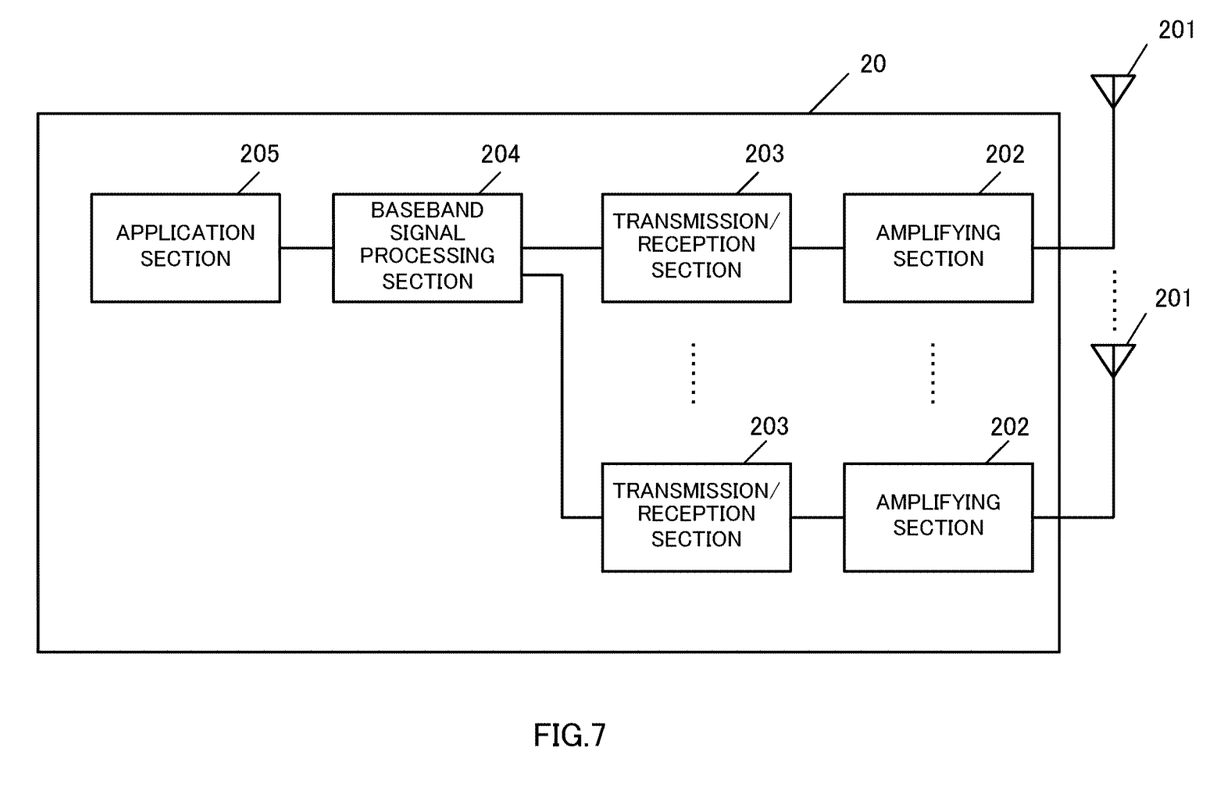
FIG. 7 is a diagram illustrating an example of entire configuration of a user terminal according to the present embodiment.

FIG. 7 is a diagram illustrating an entire configuration of the user terminal 20 according to the present embodiment. As illustrated in FIG. 7, the user terminal 20 has a plurality of transmission/reception antennas 201 for MIMO transmission, amplifying sections 202, transmission/reception sections (reception sections) 203, a baseband signal processing section 204 and an application section 205.

As for downlink data, radio frequency signals are received by the plurality of transmission/reception antennas 201, amplified by the amplifying sections 202, and frequency-converted into baseband signals in the transmission/reception sections 203. The baseband signals are subjected to FFT processing, error correction decoding, retransmission control reception processing and the like in the baseband signal processing section 204. In the downlink data, downlink user data is transferred to the application section 205. The application section 205 performs processing related to higher layers above the physical layer and the MAC layer. In the downlink data, broadcast information is also transferred to the application section 205.

On the other hand, uplink transmission data is input from the application section 205 to the baseband signal processing section 204. In the baseband signal processing section 204, retransmission control (HARQ: Hybrid ARQ) transmission processing, channel coding, precoding, DFT (Discrete Fourier Transform) processing, IFFT processing and so on are performed, and the resultant signals are transferred to the transmission/reception sections 203. In the transmission/reception sections 203, baseband signals output from the baseband signal processing section 204 are converted into a radio frequency band. After that, the frequency-converted radio frequency signals are amplified in the amplifying sections 202, and then, transmitted from the transmission/reception antennas 201.

When the user terminal 20 is connected to a Dynamic TDD cell, each transmission/reception section 203 serves as a reception section configured to receive control information including dynamic instruction of a subframe configuration of the Dynamic TDD cell transmitted from the radio base station 10. When the second specific resource transmission rule is applied, the transmission/reception section 203 serves as a reception section configured to receive a specific resource transmission configuration based on an existing table and a specific resource transmission configuration based on a newly defined table transmitted from the radio base station 10.

Figure 8:
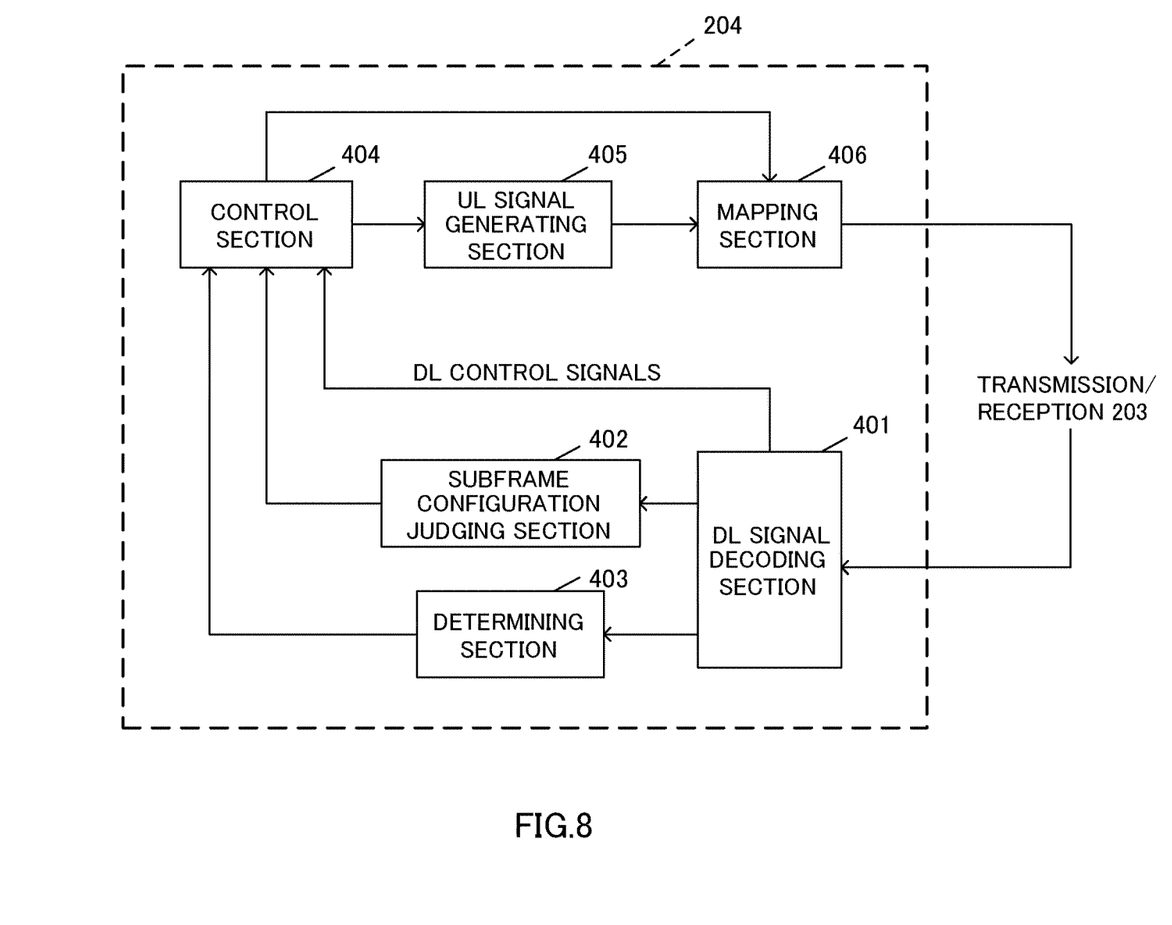
FIG. 8 is a diagram illustrating an example of functional structure of the user terminal according to the present embodiment.

FIG. 8 is a diagram illustrating a principal functional structure of the baseband signal processing section 204 provided in the user terminal 20. As illustrated in FIG. 8, the baseband signal processing section 204 of the user terminal 20 is configured to include at least a DL signal decoding section 401, a subframe configuration judging section 402, a determining section 403, a control section 404, a UL signal generating section 405 and a mapping section 406.

The DL signal decoding section 401 decodes downlink control signals transmitted on a downlink control channel and outputs scheduling information to the control section 404. The DL signal decoding section 401 decodes downlink data signals transmitted on a downlink shared channel and outputs resultant signals to the determining section 403.

The determining section 403 determines retransmission based on a decoding result of the DL signal decoding section 401 and outputs a determination result to the control section 404.

The subframe configuration judging section 402 judges control information about DL subframes and UL subframes of a Dynamic TDD cell given from the radio base station 10. The subframe configuration judging section 402 outputs information about DL subframes and UL subframes of the Dynamic TDD cell to the control section 404.

The control section 404 controls generation of uplink control signals (A/N signals etc.) and uplink data signals based on downlink control signals (PDCCH signals) transmitted from the radio base station 10 and a retransmission control determination result of received PDSCH signals. The downlink control signals received from the radio base station are output from the DL signal decoding section 401 and the retransmission control determination result is output from the determining section 403.

The control section 404 controls transmission of uplink data signals and uplink control signals based on information about a configuration of DL subframes and UL subframes of the Dynamic TDD cell output from the subframe configuration judging section 402. When the first specific resource transmission rule is applied, the control section 404 controls to stop specific resource transmission in flexible subframes in the fallback operation based on the subframe configuration of the Dynamic TDD cell given by SIB1 or higher layer signaling. When the second specific resource transmission rule is applied, the control section 404 controls to transmit specific resources using a specific resource transmission configuration based on the newly defined table.

The UL signal generating section 405 generates uplink control signals, such as transmission acknowledgement signals and feedback signals, based on the instruction from the control section 404. The UL signal generating section 405 generates uplink data signals based on the instruction from the control section 404.

The mapping section 406 controls allocation of the uplink control signals and uplink data signals to radio resources based on the instruction from the control section 404.

The present invention is not limited to the above-described embodiments and could be embodied in various modified or altered forms. In the above-described embodiments, the size and shape illustrated in the attached drawings are also not intended for limiting the present invention and could be modified appropriately as far as the effects of the present invention can be exerted. Other modification and alteration would be also made without departing from the scope of the present invention defined by the claims.

The disclosure of Japanese Patent Application No. 2014-009853 filed on Jan. 22, 2014, including the specification, drawings, and abstract, is incorporated herein by reference in its entirety.

The invention claimed is:

1. A user terminal comprising:
   a reception section that receives control information including a subframe configuration of a TDD (Time Division Duplex) cell signaled by L1 signaling; and
   a control section that, when the user terminal does not detect the subframe configuration signaled by L1 signaling, controls to stop transmission of sounding reference signals in a subframe to which transmission of an uplink shared channel is not allocated by uplink grant.

2. The use terminal according to claim 1, wherein the subframe is indicated as a downlink subframe in a subframe configuration signaled by higher layers.

3. The use terminal according to claim 1, wherein the sounding reference signals are resources that are transmitted periodically.

4. A radio base station comprising:
   a transmission section that transmits a control signal including a subframe configuration of a TDD (Time Division Duplex) cell by L1 signaling; and
   a reception section that receives sounding reference signals from a user terminal,
   wherein when the user terminal does not detect the subframe configuration signaled by L1 signaling, the reception section does not receive the sounding reference signals in a subframe to which transmission of an uplink shared channel is not allocated by uplink grant.

5. A radio communication method for a user terminal communicating in eIMTA (enhanced Interference Management and Traffic Adaptation), the radio communication method comprising the steps of:
receiving control information including a subframe configuration of a TDD (Time Division Duplex) cell signaled by L1 signaling; and
when the user terminal does not detect the subframe configuration signaled by L1 signaling, controlling to stop transmission of sounding reference signals in a subframe to which transmission of an uplink shared channel is not allocated by uplink grant.

6. A radio communication system comprising a radio base station and a user terminal communicating in eIMTA (enhanced Interference Management and Traffic Adaptation),
the user terminal comprising a
a reception section that receives control information including a subframe configuration of a TDD (Time Division Duplex) cell signaled by L1 signaling; and
a control section that, when the user terminal does not detect the subframe configuration signaled by L1 signaling, controls to stop transmission of sounding reference signals in a subframe to which transmission of an uplink shared channel is not allocated by uplink grant.

* * * * *